Aug. 2, 1949.  L. E. RUSSELL  2,478,161
WIND DEFLECTOR
Filed Nov. 10, 1948
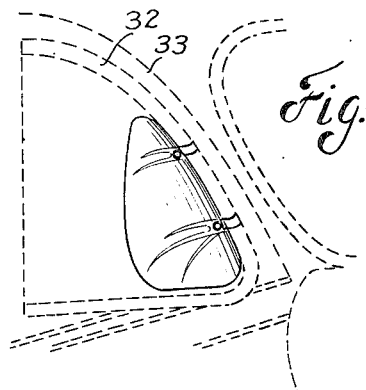
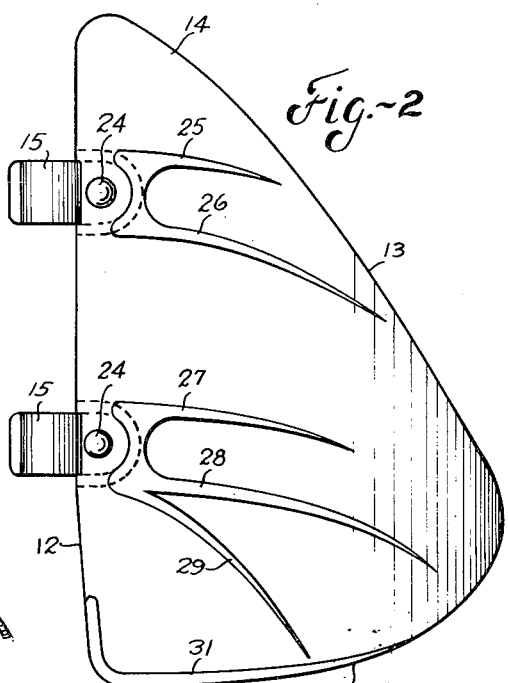
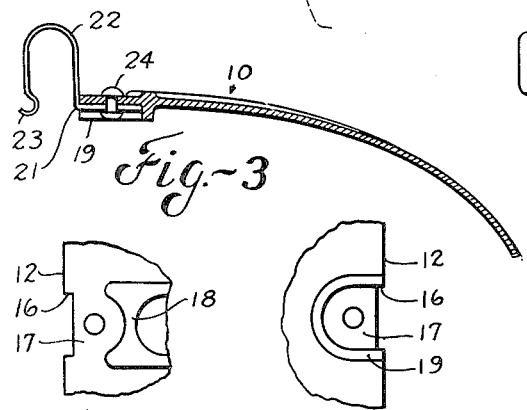
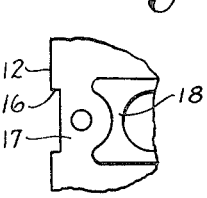
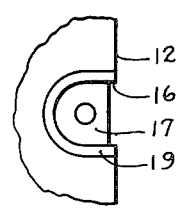
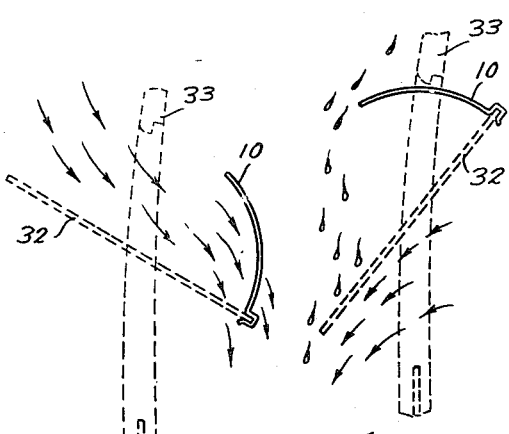
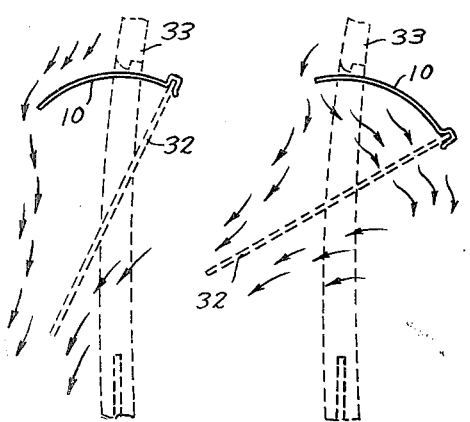
Inventor
Linus E. Russell
Tom Walker
Attorney Patented Aug. 2, 1949

2,478,161

UNITED STATES PATENT OFFICE 2,478,161

WIND DEFLECTOR

Linus E. Russell, Springfield, Ohio, assignor to Peters & Russell, Inc., Springfield, Ohio, a corporation of Ohio Application November 10, 1948, Serial No. 59,230

9 Claims. (Cl. 296—44)

This invention relates to wind or air deflectors of the kind mounted on the side windows of automobiles to induce a directed draft of fresh air through the window.

In most pleasure automobiles the front side windows include a so-called ventilator window which is mounted for pivotal movement about a substantially vertical axis to induce a "draftless" ventilation of the car. It has been proposed heretofore to provide, as an optional accessory, an air deflector for mounting upon the ventilator window whereby the functioning of the window may be improved, particularly in the respect of obtaining a controlled or directed air intake. A disadvantage of the ventilator window used alone, is that the air current produced thereby lacks direction and may be resolved simply into a strong gust directly striking the head and shoulders of the occupants of the car. By means of the air deflector, such current may be directed downwardly toward the floor of the car and a full circulation thereof be obtained for the greater benefit and comfort of the occupants. In general the air deflector is helpful in achieving more completely the purpose of the ventilator window.

Some disadvantages have attended use of the air deflectors known prior to this invention. They have, for example, been made of an opaque material such as a sheet metal stamping and so are objectionable as restricting the visibility of the driver. Additionally it has been found that with the ventilator window set to a partly open position when driving in rain, as is customary, rainwater deposited on the deflector tends to drip inside the car. Incidental objections such as relatively high cost of manufacture and difficulty of mounting and demounting the deflector also may be noted.

The instant invention contemplates the meeting or obviating of some if not all of the above objections, and to present an air deflector so characterized is the object of the invention.

In the realizing of such object there has been evolved an air deflector which meets the objection as to visibility by utilizing for the body of the deflector a molded transparent plastic material. In so doing further advantages are gained in that the cost of manufacture is cheapened and in that independent spring clamps especially suited for application to a ventilator window may be secured to the body as attachment means. Heretofore such attachment means have been formed integrally with the metal of the body. It was, therefore, relatively unyielding and made the task of removing an installed deflector particularly difficult.

To solve the problem of rainwater drip into the car, it is proposed by this invention to form on the leading or external surface of the deflector an arrangement of ribs or gutters designed to intercept rivulets of water thereon and to direct them to the outer edge of the deflector where they may drip outside the car or be blown away by the passing air current. According to a feature of the invention the ribs are molded integrally into the body of the deflector, imparting increased structural strength thereto and permitting the body to be made of a thin somewhat flexible sheet of plastic material.

The object of the invention is to simplify the construction as well as the means and mode of operation of a deflector as disclosed herein, whereby such deflector may not only be economically manufactured, but will be more efficient in use, adaptable to a wide variety of windows, having relatively few parts and be unlikely to get out of repair.

A further object of the invention is to provide a deflector of the type shown herein molded from transparent material so as to prevent a decrease in visibility, such decrease being highly objectionable and in fact prohibited in certain localities.

A further object of the invention is to provide in a deflector of the type disclosed herein means for increasing the strength thereof without impairing the transparency thereof.

A further object of the invention is to provide in combination with a deflector of the type shown herein means for preventing the entrance of water within the interior of the automobile to which it is attached.

A further object of the invention is to provide in a deflector of the instant type a limited degree of resiliency and flexibility so that it will not mar or deface the window molding should the deflector inadvertently come in contact therewith.

A further object of the invention is to improve the appearance of such deflectors so as to be less noticeable when installed upon a vehicle.

A further object of the invention is to provide a deflector possessing the advantageous structural features, the inherent meritorious characteristics and the mode of operation herein disclosed.

With the above primary and other incidental objects in view as will more fully appear in the specification, the invention intended to be protected by Letters Patent consists of the features of construction, the parts and combinations, thereof, and the mode of operation, as hereinafter described or illustrated in the accompanying drawings, or their equivalents.

Referring to the accompanying drawing, wherein is found the preferred but obivously not necessarily the only form of embodiment of the invention, Fig. 1 is a perspective view of an air deflector in accordance with the present invention installed on a ventilator window of an automobile;

Fig. 2 is a side view of the air deflector drawn approximately to full or actual scale;

Fig. 3 is a view of the deflector in cross section;

Fig. 4 is a fragmentary view showing the anchor point on the convex side of the deflector with the clamp removed;

Fig. 5 is similar to Fig. 4 but shows the under or concave side of the deflector;

Figs. 6 to 8 are diagrammatic views showing the action of the deflector in several positions of adjustment of the ventilator window; and Fig. 9 is a view similar to Figs. 4–6, showing the action of the deflector in a rainfall.

Like parts are indicated by similar characters of reference throughout the several views.

Referring to Fig. 1, an air and rain deflector is shown installed in an automobile and in Figs. 2 and 3 in detail, enlarged with respect to Fig. 1.

As illustrated, the deflector comprises a body 10 unitarily made in sheet form and shaped to the approximate outline of a right triangle. Thus, the body has a relatively broad base 11 from which projects a vertical side edge 12 and a sloping side edge 13 merging in an apex 14. Considering a line extending from the base 11 through or parallel to the apex 14 as its longitudinal axis, the body is bent or curved about such axis to an arcuate shape producing convex and concave surfaces on the respectively opposite sides or faces thereof.

At spaced positions along the length of the vertical side edge 12 are points of anchor for clamps 15 by which the deflector is attached to the automobile window. With reference to the automobile, therefore, the vertical edge 12 may be described as the inner edge of the body and the sloping edge 13 as the outer edge.

The anchor points for the clamps 15 are defined by spaced cut-outs 16 in the vertical inner edge 12. An area 17 against the underside of which the clamps 15 are mounted is defined inwardly of each cut-out 16 by a U-shaped raised rib 18 on the convex side of the body. On the opposite or concave side of the body in underlying relation to the ribs 18 are additional ribs 19 imparting increased strength to the body at the anchor points, there being two such anchor points along the vertical inner edge 12.

The clamp 15 associated with each point comprises an arm 21 and a U-shaped portion 22 bent at substantially right angles to the arm 21 and formed at its outer end with a detent 23 lying in spaced aligned relation to the arm 21. The U-shaped portions are designed to be slipped over and to frictionally engage the edge of an automobile window, the clamps having a set tension and slight yield incorporated therein for such purpose. The detent 23 is provided as a catch adapted to engage in back of the metal trim or molding ordinarily found on the peripheral edge of automobile ventilator windows.

The clamps 15 are secured to the underside of the body 10 in alignment with the area 17 by rivets 24 and the channel portions 22 are so formed with respect to the body that when installed the inner arms of the U-shaped portions are wholly contained within the cut-outs 16. When installed upon a ventilator window deflectors present the convex sides thereof to the front and exterior of the automobile.

The convex or outer surface of the body 10 has a ribbed formation performing the dual function of lending structural rigidity to the body and of directing raindrops, deposited on the body, away from the inner vertical edge 12. This ribbed formation includes, in addition to the U-shaped ribs 18, a first pair of ribs 25—26 associated with that rib 18 nearer the apex 14 and a second pair of ribs 27—28 associated with the other rib 18. The pairs of ribs 25—26 and 27—28 substantially merge with their respective rib 18 at their one end and extend in a downwardly and outwardly sloping direction toward the outer side edge 13, the slope of the ribs conforming broadly to the curvature of the edge 13.

A further rib 31 is formed along the base 11, having one end extending upward a short distance along the inner side edge 12 and merging within the surface of the body 10 at approximately the middle of the base 11. Associated with the pair of ribs 27—28 is another rib 29 which merges at its inner end with the rib 28 but slopes more abruptly to a terminus at the base 11 adjacent to the end of rib 31.

The result or effect of the ribbed formation is to interpose on the outer surface of the body ridges or gutters which intercept rainwater dripping or running downwardly along the body and direct it toward the outer side edge 13 away from the automobile from where it either drops harmlessly upon the exterior of the vehicle or is carried away by passing air currents.

While the body 10 may be formed as a sheet metal stamping as previously known, it preferably is molded of a semi-flexible plastic material. This has the advantages of simplifying formation of the rain guide ribs, reducing the cost of manufacture and of permitting the body to be made of a transparent material. The deflector is not, therefore, subject to objection as promoting a hazard due to obscured visibility. Further, in such preferred embodiment the clamps 15 are made of spring metal, resilient for attachment to any of the conventional automobile ventilator windows. The deflectors are ordinarily made and sold in pairs, one for application to the left hand car window and the other for attachment to the right hand window. The construction of each is identical except that, as will be understood, the formation and relation of the parts is reversed.

A deflector is shown in Fig. 1 attached to the leading edge of a ventilator window 32 pivoted for turning movement in the front window space of a door 33. The deflector normally lies outside the window, the edge of which window is closely gripped by the clamps 15 in a manner which does not prevent complete closing of the window. The convex surface of the body 10 faces outwardly and rearwardly and so curves away from the adjacent window frame permitting the deflector to clear such frame when the ventilator window is turned inward or opened.

It is a usual practice in driving to set the ventilator window to different positions of adjustment to vary the amount and direction of air admitted. The action of the present deflector in a number of such positions is diagrammatically illustrated in Figs. 6 to 9. In Fig. 6, the window is only slightly open. A large part of the area of the deflector remains outside the car in this position of the parts and the air current, as depicted by the arrows, is largely deflected around the window. Passage of the air current by the trailing edge of the window induces an air flow from the interior to the exterior of the car, also as indicated. In Fig. 7 the ventilator window has been further opened to bring the deflector substantially within the car. A part of the air current then is confined between the window and the deflector and is caused to enter the car, being directed by the deflector generally downward toward the floor of the car rather than directly upon its occupants. In Fig. 8 the ventilator window has been set to its fully open position. In this position of the parts the leading edge of the window becomes in effect its trailing edge, while the normally trailing edge extends outwardly and forwardly as a scoop effecting a maximum intake of fresh air into the car.

The action of the deflector in excluding rain from the interior of the car is illustrated in Fig. 9. Here the ventilator window has been set to a partly open position to permit a circulation of air and a part of the deflector lies within the car. The projecting portion of the body of the deflector interposes a barrier to the raindrops which are directed thereby away from the open window. Raindrops deposited on the deflector tend to flow down the face thereof, and were it not for the ribbed formation previously described, would drip from the bottom of the deflector into the car. By reason of such ribbed formation, however, the water is led to the outer edge of the deflector and blown off by the passing air.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. An air deflector for use on automobile windows, including a one-piece sheet-like body curved about its longitudinal axis, spaced anchor points in one side edge of said body, spring clamps fastened to said body at said anchor points and presenting clip portions for frictional engagement with the window edge, and one or more transverse ribs in one side of said body, said ribs originating adjacent said one side edge of the body and curving outwardly and downwardly toward the other side edge thereof and toward the base, and a bead on the base of said body having one end extending upward along said one side edge and terminating at its other end short of said other side edge.

2. An air and rainwater deflector for use on automobiles, including a sheet-like body, inner and outer side edges and a base, said body being curved about its longitudinal axis to define convex and concave surfaces on the opposite sides thereof, spaced recesses in the inner side edge of said body, spring clamps received in said recesses and fastened to said body for removable mounting of the deflector upon a window edge, said clamps being so arranged than an installed deflector presents the convex surface of the body to the exterior of the automobile, a formation of raised ribs on the convex surface of the body arranged to direct dripping rainwater away from the inner side edge of the body, comprising a rib surrounding each of said recesses, a pair of substantially horizontal ribs merging with each of the aforesaid ribs and extending outwardly and downwardly therefrom toward the outer side edge of the body, another rib associated with one of said pairs of ribs and curving more abruptly to terminate at the base of the body, and a further rib on the base edge having one end extending upwardly along said inner side edge and having its opposite end substantially merging with the terminal end of said other rib.

3. An air and rainwater deflector according to claim 2, characterized in that said body is molded of a transparent flexible plastic material or the like, said described ribs functioning as rainwater guides and as beads lending structural rigidity to the body.

4. In an air and rain deflector for an automobile, a transparent semi-flexible body portion, and a plurality of transversely extending ribs thereon, one of said plurality of ribs extending along the bottom edge of said body, the remainder of said ribs being spaced upwardly relative thereto and extending outwardly and downwardly relative to the body portion, one of said remaining ribs having a greater inclination than the others terminating adjacent the end of the first mentioned rib.

5. An air deflector for use on automobile windows, including a one-piece, sheet-like body curved about its longitudinal axis, anchor points on one side edge thereof, clamp means fastened to said body at said anchor points and presenting clip portions for frictional engagement with the window edge, and one or more transverse ribs in one side of said body, said ribs originating adjacent one side edge of the body and projecting toward the other side edge thereof, said one or more ribs including a rib on the base of said body having at least one end extending upwardly along a side edge of the body.

6. An air deflector for use on automobile windows, including a one-piece, sheet-like body curved about its longitudinal axis, anchor points in one side edge of said body, spring clamps fastened to said body at said anchor points and presenting clip portions for frictional engagement with the window edge, and a plurality of transverse ribs in one side of said body originating adjacent said one side edge of the body and extending transversely of said body toward the other side edge, said ribs including a first rib curving outwardly and downwardly and terminating at said base adjacent the other side edge and a second rib on the base edge having one end extending upwardly along one side edge and its opposite end substantially meeting with the terminal end of said first rib.

7. An air and rainwater deflector for use on automobiles, including a sheet-like body, inner and outer side edges and a base, said body being curved about its longitudinal axis to define convex and concave surfaces on the opposite sides thereof, spaced recesses in the inner side edge of said body, spring clamps received in said recesses and fastened to said body for removable mounting of the deflector upon a window edge, said clamps being so arranged that an installed deflector presents the convex surface of the body to the exterior of the automobile, a formation of raised ribs on the convex surface of the body arranged to direct dripping rainwater away from the inner side edge of the body, comprising an arcuate rib adjacent each of said recesses, a substantially horizontal rib merging with each of the aforesaid ribs and extending transversely of the body toward the outer side edge thereof, and a further rib on the base edge of the body, at least one end thereof extending upwardly along a side edge of the body.

8. An air and rainwater deflector for use on automobile windows, including a one-piece, sheet-like body having inner and outer side edges and a base edge, said body being curved about its longitudinal axis to define convex and concave surfaces on the opposite sides thereof, spaced recesses in the inner side edge of said body, spring clamps received in said recesses and fastened to said body for removable mounting of the deflector upon an automobile window, said clamps being so arranged that an installed deflector presents the convex surface of the body to the exterior of the automobile, and a formation of raised ribs on both the convex and concave surfaces of the body, including a rib surrounding each of the recesses and the ends of the spring clamps received therein, said ribs being on the concave side of the deflector, an arcuate rib adjacent each of said recesses on the convex side of the deflector body, and a substantially horizontal rib merging with each of said arcuate ribs and extending transversely of the deflector body toward the outer side edge thereof, the construction and arrangement being such that the ribs on the convex side of the deflector body direct dripping rainwater away from the inner side edge of the deflector body and the automobile upon which the deflector is mounted.

9. An air deflector for use on automobile windows, including a one-piece sheet-like body, having inner and outer side edges and a base, said body being curved about its longitudinal axis to define convex and concave surfaces on the opposite sides thereof, spring clamp means fastened to the inner side edge of said body and frictionally engageable with the window edge, said clamping means being arranged in such a manner that an installed deflector presents its convex surface to the exterior of the automobile, and at least one raised rib on the convex surface of said body originating adjacent said inner side edge substantially above the lower edge thereof and extending transversely of said body toward the outer edge, and curved outwardly and downwardly and terminating adjacent said base and outer side edge of the body.

LINUS E. RUSSELL.

REFERENCES CITED

The following references are of record in the file of this patent:

UNITED STATES PATENTS

| Number | Name | Date |
| --- | --- | --- |
| 2,147,855 | Normandin | Feb. 21, 1939 |
| 2,224,433 | Holden | Dec. 10, 1940 |
| 2,263,860 | Schell | Nov. 25, 1941 |
| 2,354,443 | Schirra | July 25, 1944 |